US012773760B2

(12) United States Patent
Perrigouard et al.

(10) Patent No.: US 12,773,760 B2
(45) Date of Patent: Oct. 27, 2026

(54) SCREW ASSEMBLY FOR A CLAMPING DEVICE

(71) Applicant: FRESENIUS VIAL SAS, Brézins (FR)

(72) Inventors: Florie Perrigouard, La Tronche (FR); Mathieu Paoli, La Murette (FR); Damien Archat, Grenoble (FR)

(73) Assignee: Fresenius Vial SAS, Brézins (FR)

( * ) Notice: Subject to any disclaimer, the term of this patent is extended or adjusted under 35 U.S.C. 154(b) by 488 days.

(21) Appl. No.: 18/258,894

(22) PCT Filed: Dec. 21, 2021

(86) PCT No.: PCT/EP2021/086921

§ 371 (c)(1),
(2) Date: Jun. 22, 2023

(87) PCT Pub. No.: WO2022/144225

PCT Pub. Date: Jul. 7, 2022

(65) Prior Publication Data

US 2024/0042579 A1 Feb. 8, 2024

(30) Foreign Application Priority Data

Dec. 29, 2020 (EP) .................................... 20290091

(51) Int. Cl.

| | |
|---|---|
| ***B25B 5/00*** | (2006.01) |
| ***B25B 1/12*** | (2006.01) |
| *B25B 5/10* | (2006.01) |

(52) U.S. Cl.

CPC .............. *B25B 1/125* (2013.01); *B25B 5/102* (2013.01)

(58) Field of Classification Search

CPC .................................... B25G 3/00; B25G 3/36

See application file for complete search history.

(56) References Cited

U.S. PATENT DOCUMENTS

| | | | |
|---|---|---|---|
| 5,426,989 | A | 6/1995 | Uhlmann et al. |
| 5,603,584 | A | 2/1997 | Schuele |
| 5,730,434 | A | 3/1998 | Schoene et al. |

(Continued)

FOREIGN PATENT DOCUMENTS

| | | |
|---|---|---|
| CN | 111566309 A | 8/2020 |
| DE | 29803808 | 6/1998 |

(Continued)

OTHER PUBLICATIONS

International Search Report and Written Opinion, counterpart International App. No. PCT/EP2021/086921 (Apr. 14, 2022) (10 pages).

(Continued)

*Primary Examiner* — Lee D Wilson

(74) *Attorney, Agent, or Firm* — Cook Alex Ltd.

(57) ABSTRACT

A screw assembly (1) for a clamping device (4) comprises: a screw (2; 2') with a thread (20) having a thread axis (A) and a handle (3; 3') having a thread section (311) constituting a nut, wherein the screw (2; 2') and the handle (3; 3') are fixed together as a screw-nut assembly, wherein at least one of the thread section (311) of the handle (3; 3') and the thread (20) of the screw (2; 2') is formed at least partially with a geometry varying along the thread axis (A) such that the screw (2, 2') and the handle (3, 3') are engaged by helicoidal wedging.

13 Claims, 6 Drawing Sheets

(56) References Cited

U.S. PATENT DOCUMENTS

| | | | | |
|---|---|---|---|---|
| 7,048,241 | B2 | 5/2006 | Crain et al. | |
| 7,210,382 | B2 * | 5/2007 | McCracken | B25B 23/0064 81/125 |
| 8,226,074 | B1 * | 7/2012 | Hughey | B25B 5/003 269/238 |
| 8,382,415 | B1 | 2/2013 | Goldbaum | |
| 8,925,167 | B1 * | 1/2015 | Miller | B25B 27/023 29/256 |
| 11,384,803 | B1 * | 7/2022 | Garrettson | B25B 27/0035 |
| 11,499,584 | B2 * | 11/2022 | Wu | F16B 37/0885 |
| 12,134,172 | B2 * | 11/2024 | Gurule | B25B 5/16 |
| 2007/0248421 | A1 | 10/2007 | Kakai et al. | |
| 2008/0027397 | A1 | 1/2008 | DeRuntz et al. | |
| 2011/0110746 | A1 * | 5/2011 | Smith | F16B 35/02 411/433 |
| 2012/0272491 | A1 | 11/2012 | Hondo | |
| 2020/0325734 | A1 | 10/2020 | Langford et al. | |
| 2020/0384612 | A1 | 12/2020 | Haimer | |
| 2024/0042579 | A1 * | 2/2024 | Perrigouard | B25G 3/32 |

FOREIGN PATENT DOCUMENTS

| | | |
|---|---|---|
| DE | 102015122699 | 6/2017 |
| EP | 0958892 | 11/1999 |
| WO | WO 89/10238 | 11/1989 |

OTHER PUBLICATIONS

Office Action and Search Report (with English translation), counterpart Chinese App. No. 202180076917 (Feb. 2, 2026) (13 pages).

Communication, counterpart European Patent No. 21843698 (May 20, 2026) (6 pages).

* cited by examiner (A-A)

(B-B)

SCREW ASSEMBLY FOR A CLAMPING DEVICE

The present application is a U.S. National Stage of PCT International Patent Application No. PCT/EP2021/086921, filed Dec. 21, 2021, which claims priority to EP Application No. 20290091.6, filed Dec. 29, 2020, both of which are hereby incorporated herein by reference.

The invention relates to a screw assembly according to the preamble of claim 1, to a clamping device, and to a medical device.

A screw assembly of this kind comprises a screw with a thread, the thread having a thread axis, and a handle.

Such a screw assembly may generally be used in a clamping device, particularly for medical devices, e.g., to fix a medical device to a pole at the bedside of a patient in a healthcare environment.

A screw assembly of this general kind is described in DE 10 2015 122 699 A1. Therein, a spindle comprises a portion that is threaded and forms a screw, and a portion that is not threaded. A knob receives the portion of the spindle that is not threaded and interacts therewith by means of a coupling device. In order to release the screw assembly from a clamp main body, a lever on the clamp main body is actuated.

The known screw assembly has a complex construction and needs a complicated manufacturing process with high manufacturing costs. In particular, many movable parts are necessary on the clamp main body and at the screw assembly. Further, the spindle needs a threaded portion and a portion without a thread, so it is not possible to use standard screws for the known assembly.

Further, the applicant is aware of other possibilities to couple a handle to a screw by machining the screw, e.g., so as to have a polygonal cross-sectional shape, and forming the handle accordingly, such that the handle and the machined screw are secured against relative rotation by a form-locking fit. These solutions are very robust but require machining of the screw what again may increase the manufacturing costs.

It is an object of the instant invention to provide a screw assembly for a clamping device that can be manufactured in a simple manner.

This object is achieved by means of the screw assembly for a clamping device comprising the features of claim 1.

Herein, the invention relates to a screw assembly for a clamping device, comprising a screw with a thread having a thread axis and a handle having a thread section constituting a nut, the screw and the handle being fixed together as a screw-nut assembly, characterized in that at least one of the thread section of the handle and the thread of the screw is formed at least partially or partially with a geometry varying along the thread axis such that the screw and the handle are engaged by helicoidal wedging.

Especially, at least one parameter of the geometry of the thread of the screw and the corresponding parameter of the geometry of the thread section of the handle of the screw assembly at least partially do not match.

In a usual screw-nut assembly the parameters defining a thread, such as thread diameter, core diameter, pitch, thread height, flank angle, are corresponding—not necessarily identical—such that the nut can be engaged and disengaged easily on the screw following the well-known technics in the field of screw-nut assemblies.

In a preferred embodiment of the invention, at least one these parameters does not match or correspond between the thread of the screw and the thread section of the handle such that the engagement of the thread section of the handle on the thread of the screw radially expands the thread section, under a helicoidal wedging effort which is also referred to as a force fit in the following, and secures the handle to the screw due to the increasing friction efforts. The helicoidal wedging effort is originating from the discrepancy between the not corresponding parameters of the geometries of the threads. The screw and the handle are fixed to one another in the manner of a screw-nut assembly.

Accordingly, when mounting the handle on the screw the variation of the parameter allows to tighten the handle on the screw in a very simple manner, and it is even possible to use a standard screw without any modifications, i.e., without the necessity to machine the screw. This allows significantly reduced manufacturing costs as well as a specifically robust solution. For example, the handle comprises a thread to engage in the thread of the screw.

According to an embodiment the handle comprises a knob with a receptacle, and one or two inserts that is/are arranged in the receptacle of the knob. To mount the knob on the screw the insert(s) may first be mounted on the screw, wherein as a second step the knob is mounted on the insert(s), or the insert(s) may first be inserted into the receptacle, and then mounted on the screw together with the knob. The handle may consist of the knob and the insert(s) without the need for any further parts.

According to an embodiment the insert(s) of the handle form(s) a thread for engagement with the screw thread. The thread of the inserts engages in the thread of the screw. Formed as two inserts, e.g., as two shells that are adapted to receive the screw in between, the inserts may be easily produced with an internal thread that is described by the at least one parameter that varies along the thread axis.

According to an embodiment the insert(s) is/are in a form-locking engagement with the knob when mounted thereon. The form-locking engagement prevents a rotation of the knob with respect to the insert(s) about the thread axis.

According to an embodiment the knob comprises an inner body that forms the receptacle, and an outer body, wherein the inner body is arranged within the outer body. Therein, a space may be formed between the inner body and the outer body. This allows the inner body to be deformed, particularly to be widened, during assembly of the handle on the screw. The inner and outer bodies may be connected to one another via webs. The knob may be formed in one piece, e.g., by means of injection molding.

According to an alternative embodiment the handle forms a thread for engagement with the screw thread and is formed in one piece, e.g., by means of injection molding. This embodiment allows to use only two pieces of material for the screw assembly, the screw and the handle.

The at least one parameter that varies along the thread axis may be a parameter that describes the thread of the screw and/or the thread of the knob (in particular formed by the insert(s)). Optionally, the at least one parameter comprises a thread thickness (measured in a direction parallel to the thread axis) that varies along the thread axis. This can apply to the screw and/or to the handle. That is, the thickness of a ridge between two windings of a groove forming the thread is different at a first point of the thread along the thread axis compared to a second point of the thread along the thread axis, e.g., of the thread formed by the two inserts. The thickness of the ridge may be measured e.g., at the tip or at the foot of the ridge, in particular in the direction of the thread axis. This leads to an increasing collision of the engaging threads along the screw axis and, thus, to an outward force that generates a friction between the engaging threads. This friction results in the force fit of the handle with respect to the screw.

Optionally, the thread thickness increases, e.g., continuously, along the thread axis. This allows to screw the handle onto the screw until it is fixed thereto by means of the force fit.

Alternatively, the geometry of the starting portion of the thread of the screw and the geometry of the starting portion of the thread section of the handle correspond, so as to ease the first step of the screwing. Then, the geometry of at least one thread varies continuously or even discontinuously along the thread axis so as to generate the wedging effect on a further step during the screwing.

Alternatively or in addition to the thread thickness, the at least one parameter may comprise a diameter that varies along the thread axis. Again, this can apply to the screw and/or to the handle. For example, the diameter may be an outer diameter of the screw, an inner diameter of at least one part of the handle, and/or an outer diameter of the insert(s). While mounting the handle on the screw, again, an outward force can be generated in this manner so as to generate the force fit between the handle and the screw.

Alternatively or in addition to the thread thickness and/or the diameter, the at least one parameter may comprise a thread pitch that varies along the thread axis. This can generate a tension between side walls of thread windings which may lead to the force fit via a friction.

As an example, the screw and/or the handle may have a trapezoidal thread. This allows to ease the motion of the screw in the clamping device.

According to an aspect, a clamping device is provided. The clamping device comprises a main body with a screw hole, and a screw assembly according to any embodiment described herein. Therein, the screw of the screw assembly is screwed into the screw hole of the main body (and, before assembly, can be screwed into the screw hole of the main body). The advantages and advantageous embodiments described above for the screw assembly equally apply also to the clamping device, such that it shall be referred to the above.

According to an embodiment the main body of the clamping device forms a claw with a receptacle adapted to receive a pole or another object, wherein screwing the screw of the screw assembly deeper into the screw hole of the main body fixes the clamping device on the pole (or other object).

According to an aspect, a medical device, e.g., a rack or pump, for providing a medical function (e.g., for providing a pumping or monitoring function) is provided. The medical device comprises a clamping device according to any embodiment described herein. The advantages and advantageous embodiments described above for the screw assembly and clamping device equally apply also to the medical device, such that it shall be referred to the above.

The idea underlying the invention shall subsequently be described in more detail with reference to the embodiments shown in the figures. Herein:

Figure 1:
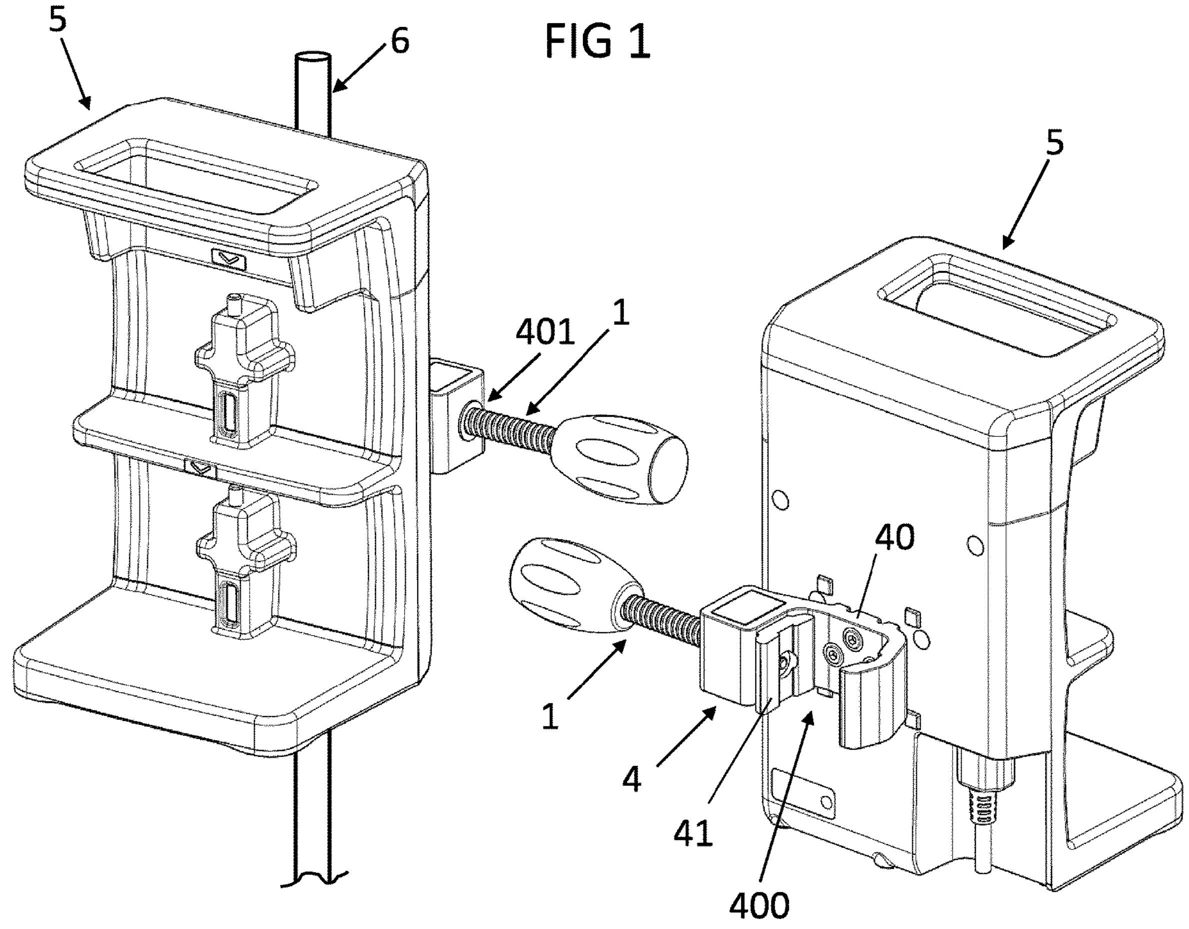
FIG. 1 shows a front view of a medical device mounted on a pole by means of a clamping device, and a rear view of such a medical device including the clamping device.

FIG. 1 shows a medical device 5 in perspective views on the front and rear sides. The medical device 5 is, in this example, a rack for infusion pumps. The medical device 5 comprises a clamping device 4 for mounting the medical device 5 to another device, such as a pole 6 as shown in FIG. 1, to a rail or to a bed element to name a few examples. The pole 6 with the medical device 5 may be placed, e.g., at the bedside of a patient, for example in a healthcare environment, such as in an intensive care unit of a hospital.

In such and other environments it is often necessary to quickly mount (and unmount) a medical device 5 or a plurality of medical devices 5 of the same kind or of different kinds, to a holder, such as the pole 6.

In this example, the medical device 5 defines multiple slots that each provide for a mechanical and electrical connection for the infusion pumps and/or other devices. However, the clamping device 4 can also be used with other types of devices, particularly medical devises. The clamping device 4 can be mounted to the medical device 5 by means of screws.

The clamping device 4 comprises a main body 40 having a shape of a claw. The main body defines a receptacle 400 adapted to receive the pole 6 (or another member such as a bar or tube). Further, the clamping device 4 comprises a screw assembly 1 which will be described in more detail below. A screw of the screw assembly 1 is screwed into a screw hole 401 of the main body 40. The screw hole 401 leads to the receptacle 400. The further the screw of the screw assembly 1 is screwed into the screw hole 401, the deeper a tip portion of the screw assembly 1 is moved into the receptacle 400 in order to fix the pole 6 or other holder in the receptacle 400 against the main body 40. To increase the contact surface and for a tight fixture without damaging the pole 6, a driver 41 is (optionally) mounted on the tip portion of the screw assembly 1.

Turning now to FIGS. 2A to 2D, the screw assembly 1 will be described in more detail. The screw assembly 1 comprises a screw 2 and a handle 3.

The screw 2 has a thread 20. The thread 20 extends over almost the entire length of the screw 2, only with the exception of an end portion of the screw 2 being formed as a pin 22 that, in one embodiment, carries a disc 21. In this first embodiment especially depicted on FIGS. 2A and 2C, the disc is used to directly press against a pole of a bedside. In a second embodiment of FIG. 2B, the screw may be used in conjunction with the driver 41 to press against a pole of a bedside. These first and second embodiments of the end portion of the screw 2 are not described further as being well known in the related art.

The disc 21 may be mounted on the driver 41 of the clamping device 4. The pin 22 and disc 21 are optional. If the screw 2 does not comprise the pin 22 and disc 21, the thread 20 may extend over the entire length of the screw 2.

Figure 2A:
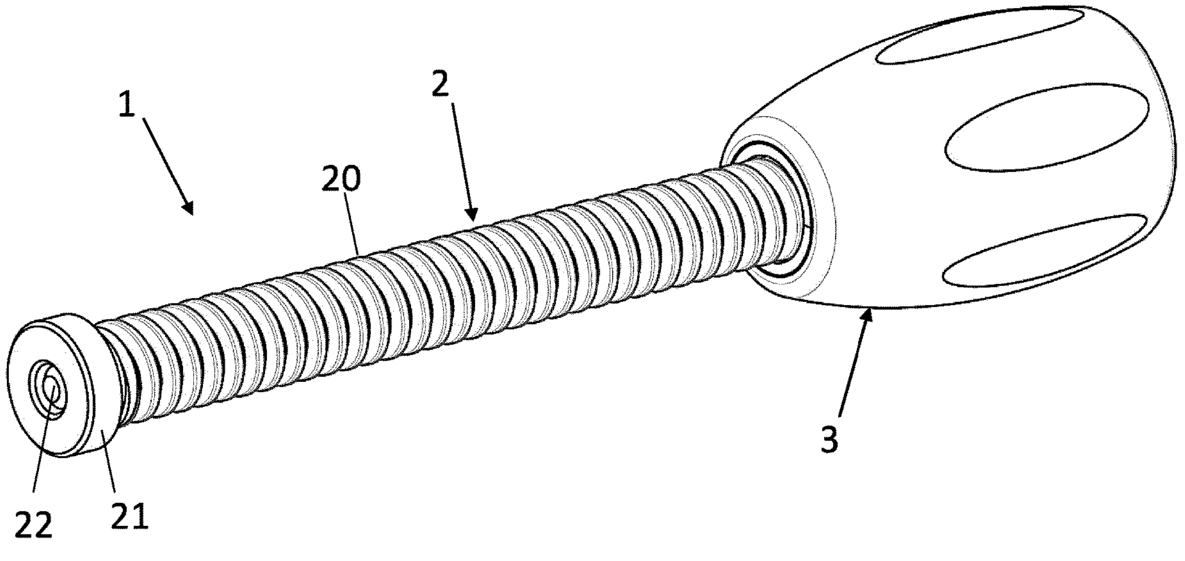
FIGS. 2A to 2D show views of an embodiment of a screw assembly for the clamping device.
Figure 2B:
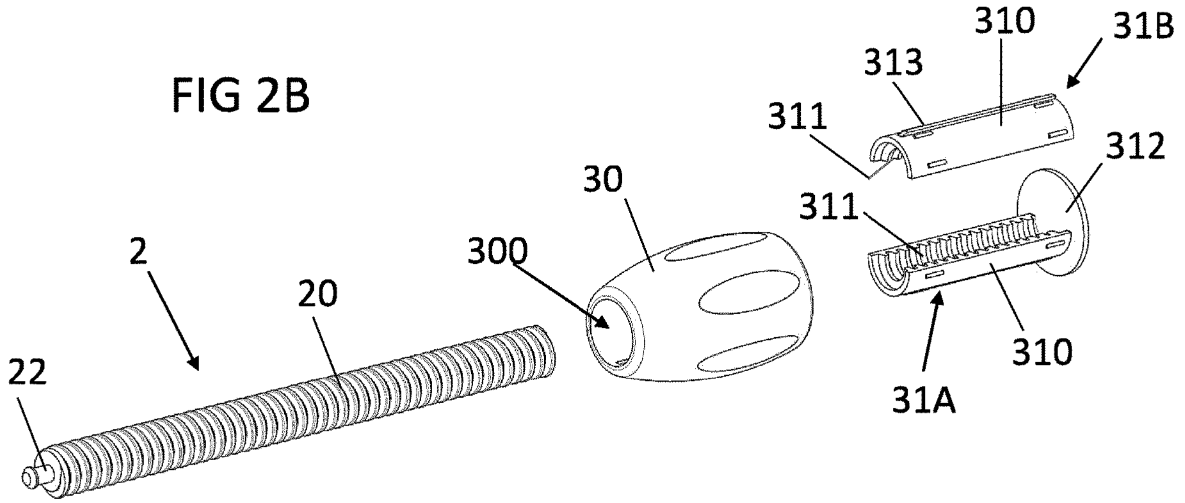
Figure 2C:
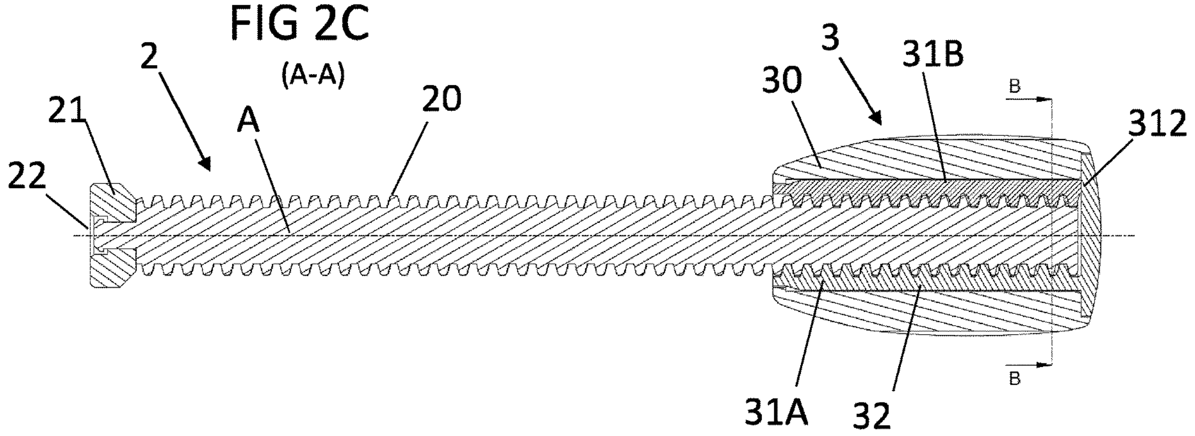
Figure 2D:
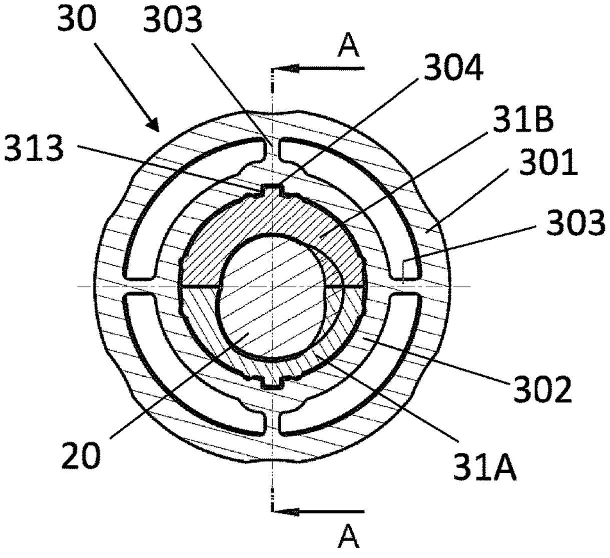

The thread 20 of the screw 2 defines a screw axis A (see FIG. 2C). The thread 20 is wound around and along the central thread axis A. Along the thread axis A the thread 20 has a (regular) constant pitch, a constant diameter and a constant thread thickness. The thread 20 is a trapezoidal thread.

The handle 3 is mounted on the screw 2, and secured thereon, by means of a force fit. To create the force fit, at least one component of the screw assembly 1 is formed with a geometry being defined by at least one parameter that varies along the thread axis A. In this example, the screw 2 geometry is constant along the thread axis A, but the handle 3 has components with a geometry varying along the thread axis A to create the force fit.

The handle 3 comprises (and, in this example, consists of) an outer knob 30 that forms a receptacle, and two inserts 31A, 31B that are, in the mounted state of the screw assembly 1 as shown in FIG. 2A, inserted into the receptacle 300 of the knob 30. The two inserts 31A, 31B each comprise a shell 310. Each insert 31A, 31B has a thread section 311, the inserts constituting a nut. As particularly shown in FIGS. 2A, 2C and 2D, the screw 2 and the handle 3 together form a screw-nut assembly and, thus, are fixed to one another in the manner of a screw-nut assembly.

Thus, the inserts 31A, 31B are threaded inserts. Together the inserts 31A, 31B form an inner thread 32 that can be engaged with the outer thread 20 of the screw 2. The screw 2 may be arranged between the inserts 31A, 31B or screwed into the inserts 31A, 31B. A first one of the inserts 31A comprises an end cap 312 that defines an end stop for the screw 2. It is also conceivable, within the scope of the present invention, that the end cap 312 is an additional element not being part of one of the inserts 31A, the end cap 312 being then attached to one of the inserts 31A, 31B or to the knob 30 by any conventional means.

The number of the inserts 31A, 31B is not limited to two elements as it is depicted on the figures. It may be possible, within the meaning of the invention, to implement different number of inserts, as for example three or more inserts, or even one single insert can be used.

To prevent a rotation of the knob 30 relative to the inserts 31A, 31B, the inserts 31A, 31B and the knob 30 comprise form-locking features. In this example, each of the inserts 31A, 31B comprises a rib 313 which is, in the mounted state, received in a corresponding groove 304 of the knob 30, see FIGS. 2B and 2D. The grooves 304 extend in parallel to the thread axis A. Also the ribs 313 extend in parallel to the thread axis A. The ribs 313 may be referred to as anti-rotation ribs. The number and the shape of the ribs 313 is not limitative and could differ from this example. Any conventional means to prevent the rotation of the knob during the mounting of the handle 3 can be used within the scope of the invention.

Each of the inserts 31A, 31B is formed in one piece. The inserts 31A, 31B may be made of plastics, e.g., made of polyamide. The knob 30 is formed in one piece, e.g., made of plastics. The knob 30 has an inner body 302 that forms the receptacle 300 of the knob 30, and that comprises the grooves 304, see FIG. 2D. Further, the knob 30 has an outer body 301 which may be grasped by a user. The outer body 301 has depressions to improve the handling for the user.

The outer and inner bodies 301, 302 are firmly connected to one another by means of webs 303. The webs 303 extend radially outward with respect to the thread axis A. Between the webs 303 and the outer and inner bodies 301, 302, inner spaces are formed. This allows a reduced weight and material usage, as well as a deformation (particularly an elastic deformation) of the inner body 302 when mounting the inserts 31A, 31B and knob 30 on the screw 2.

This deformation of the inner body 302 is effective by an interference of the thread 32 of the handle 3 with the thread 20 of the screw 2. This interference is created by the geometry of the inserts 31A, 31B being defined by at least one parameter that varies along the thread axis A, wherein in this example, the parameter is the thread thickness.

The thread thickness is measured in a direction parallel to the thread axis A as the thickness of the ridge between two windings of the groove forming the thread.

Figure 3:
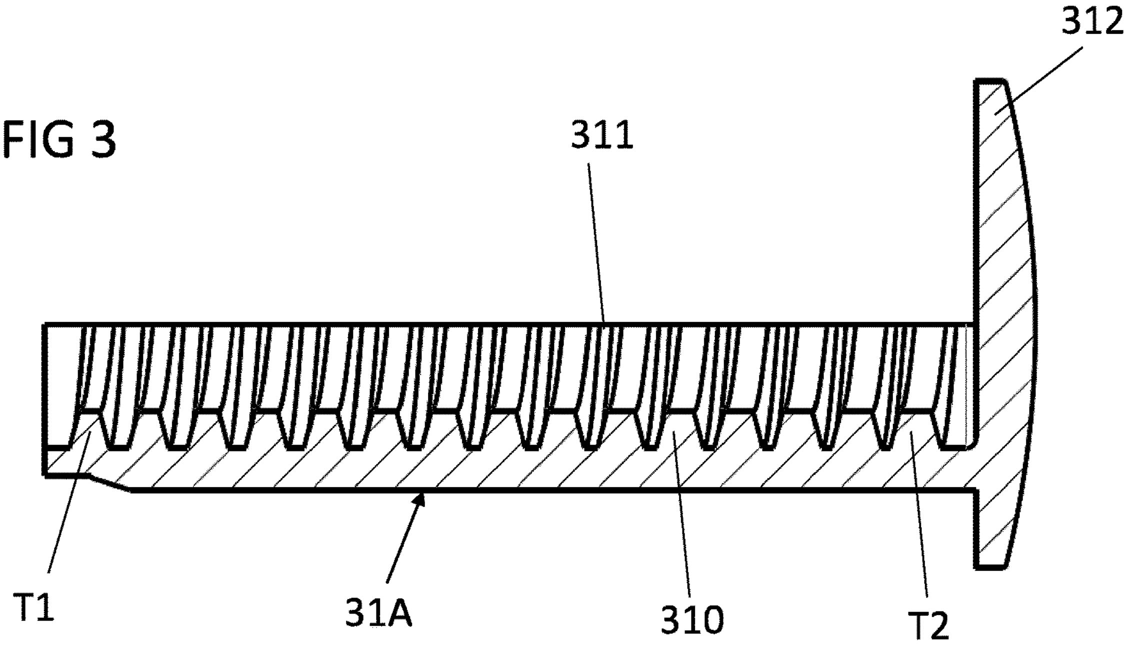
FIG. 3 shows a cross-sectional view of an insert of a handle of the screw assembly of FIGS. 2A-2D.

FIG. 3 shows the first insert 31A with the thread section 311. Along the thread axis A, the thread section 311 (and the thread 32 formed together with the second insert 31B) has thread sections with different geometries. For example, a first thread portion T1 at a first position along the thread axis A and a second thread portion T2 at a different position along the thread axis A are indicated.

At the first thread portion T1 the thread groove is broader (in the direction of the thread axis A) than at the second thread portion T2. On the other hand, at the first thread portion T1 the thread ridge is narrower (in the direction of the thread axis A) than at the second thread portion T2. The sum of ridge width and groove width are the same at both thread portions T1, T2, so the thread pitch is constant along the thread axis A, while the thread thickness varies along the thread axis A. In the present example, the thread thickness of the thread 32 constantly varies along the thread axis A. At the first thread portion T1 the thread 32 has the same thickness (and pitch) as the screw 2 thread 20. Thus, at the first thread portion T1 the thread 32 is compatible with the screw 2 thread 20 and can be screwed onto the screw 2 thread 20 easily.

Figure 4:
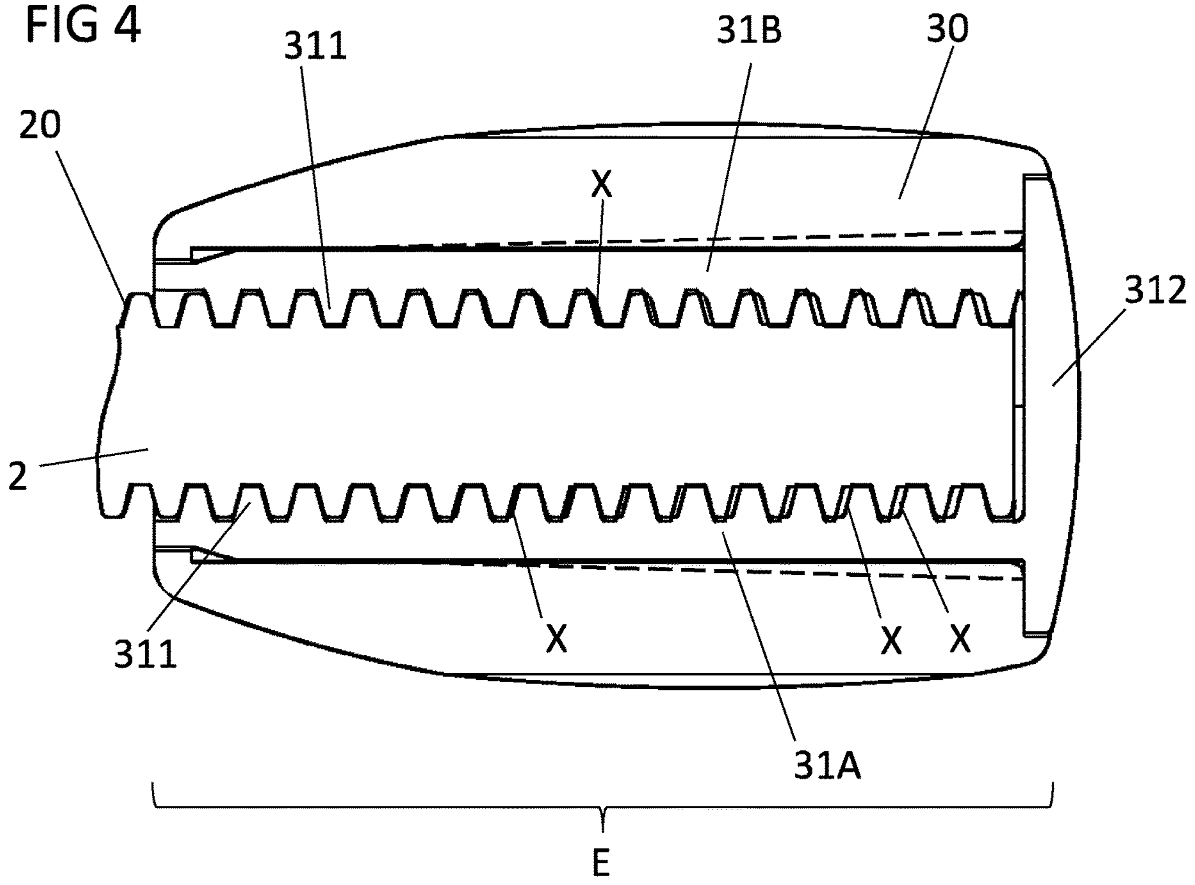
FIG. 4 shows a cross-sectional view of the screw assembly of FIGS. 2A-2D.
Figure 5A:
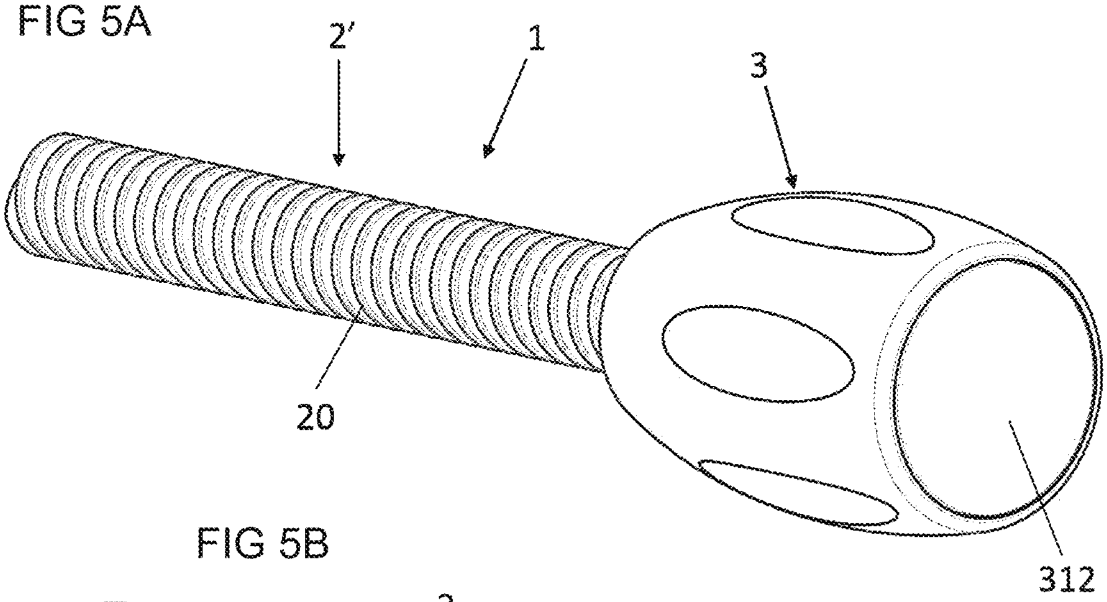
FIGS. 5A and 5B show views of a screw assembly for the clamping device.
Figure 5B:
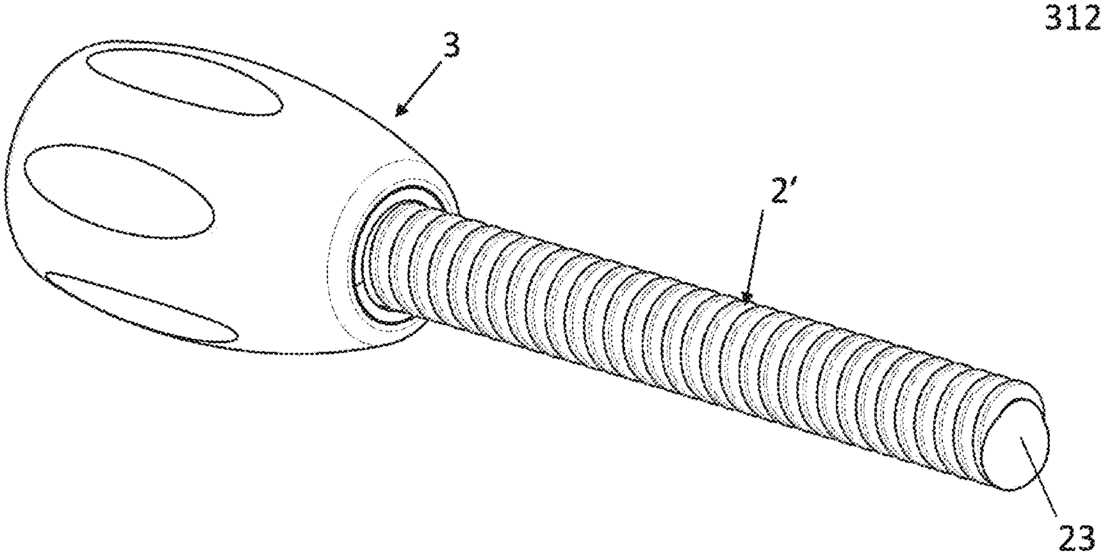

The effect of this thread geometry will be described with reference to FIG. 4. Therein, an engagement region E of the screw 2 is shown in a cross-sectional view, wherein the inserts 31A, 31B are shown to be mounted on the screw 2. Further, the knob 30 is shown superimposed on the inserts 31A, 31B. Due to the varied thread thickness of the thread 32 of the handle 3 that engages the thread 20 which in this example has a constant thread thickness, the two threads 20, 32 interfere with one another in the engagement region E. FIG. 4 indicates an overlapping occupied space of the ridges of the threads 20, 32 as interferences X. Notably, the size of the interference increases towards the end cap 312, as does the thread thickness of the handle 3 thread 32. Thus, when actually assembling the screw assembly 1, the inserts 31A, 31B are urged outwards in accordance with the size of the (theoretical) interferences X illustrated in FIG. 4 and facilitated by the trapezoidal thread shape. The space between the outer and inner bodies 301, 302 of the knob 30 allows the inner body 302 to be widened by the inserts 31A, 31B that are pushed outwards. This leads to an elastic deformation of the inner body 302 which, in turn, elastically forces the inserts 31A, 31B inwards, and pushes the thread sections 311 of the inserts 31A, 31B against the thread 20 of the screw 2. Thus, due to the geometry varying along the thread axis A, and by screwing the handle 3 on the screw 2, the screw 2 and the handle 3 are in fixed engagement with one another by helicoidal wedging. The helical threads 20, 32 are wedged against each other. The corresponding effort is an increased friction and thus a force fit of the handle 3 on the screw 2.

For mounting the handle 3 on the screw 2 there are two possibilities. For example, the inserts 31A, 31B may first be inserted into the receptacle 300 of the knob 30 to assemble the handle 3. Then, the handle 3 may be screwed onto the screw 2. To do so, the screw 2 may be fixed by means of a tool, such as pliers and/or a cap nut. Due to the constantly increasing thread thickness of the thread 32 screwing the handle 3 onto the screw requires an increasing torque that finally leads to the force fit. For example, the handle 3 is screwed so far onto the screw 2 that the torque that would be required to loosen it again would be at least 5 Nm, at least 10 Nm, at least 20 Nm or at least 30 Nm. Like this, the handle 3 will not loosen from the screw 2 after assembly by the intended, manual use. Optionally one or both of the threads 20, 32 are provided with a coating and/or surface treatment to increase the friction. The collision between the inserts 31A, 31B and the knob 30 may be calculated such that the outward force obtained at the end of the mounting process generates a friction force which is above the one needed for a user to unscrew the handle 3 with his sole hand (in both rotation and translation).

As another option, first the inserts 31A, 31B are mounted on the screw 2, and then the knob 30 is axially translated (e.g., sunk) onto the inserts 31A, 31B with force.

After coupling, the screw assembly 1 is particularly robust. After the handle 3 has been coupled with the screw 2, the two can be taken apart using standard tools, e.g., a hammer. Like this, no specific tools are necessary for exchanging parts or for recycling parts.

It is worth noting that varying, in particular a constantly increasing thread (ridge) thickness in a direction parallel to the thread axis A (towards the end cap 312) is not the only conceivable geometry parameter.

For the clamping device to which the present invention is intended, the typical range for the screw and inserts diameter is between 5 to 20 mm with a thread pitch which lies in the range of 0.5 to 5 mm and an increasing thread thickness between 0.01 and 1 mm per turn, although these ranges are not limiting but only indicative. It is indeed possible to implement the invention with different dimensions ranges, depending on the application and the overall size of the device.

As a preferred, but non-limiting example, the screw 2 has a trapezoidal thread with a diameter of 12 mm and a pitch of 3 mm while the corresponding inserts 31A, 31B have a similar pitch of 3 mm but with an increasing thread thickness of 0.04 mm at each turn. Still as an example, with 15 thread turns inserts 31A, 31B, the thickness of the thread is increased by 0.6 mm (15×0.04 mm) on the last turn of the thread.

According to another embodiment the thread thickness (of the thread 20 of the screw and/or the thread 32 of the handle 3) is constant while the thread pitch of one or both of the threads 20, 32 is varied along the thread axis, e.g., increased or decreased from the front to the rear of the handle 3. Alternatively, a combination of a varied thread thickness of at least one of the threads 20, 32 with a varied thread pitch of at least one (e.g., the same one) of the threads 20, 32 is applied. In yet another embodiment a varying diameter of at least one of the components of the screw assembly 1 along the thread axis A is provided. The varying diameter may be combined with a varying thread thickness and/or a varying thread pitch. The varying diameter may be a varying thread pitch diameter.

FIG. 4 indicates with dashed lines an optional geometry of the inserts 31A, 31B being described by a parameter, the external diameter, that varies, i.e., steadily increases, along the thread axis A. For example, at one position along the thread axis A the outer diameter of the two assembled inserts 31A, 31B is smaller or equal to the inner diameter of the receptacle 300 of the knob 30, while at a different position along the thread axis A their outer diameter is larger than the inner diameter of the receptacle 300. After mounting the inserts 31A, 31B onto the screw 2, translating the knob 3 on the inserts 31A, 31B will require an increasing force and thus urge the thread sections 311 of the inserts 31A, 31B against the screw 2 thread 20 leading to a force-locking connection.

FIGS. 5A-10B show the same handle 3 as described above with a screw 2' that has the same thread 20 as the screw 2 described above, but no pin and disc at the end. Instead, both ends 23 of the screw 2' are flat. Thus, it will be appreciated that this screw 2' may be a standard part of a certain length without the need for any machining.

Figure 6:
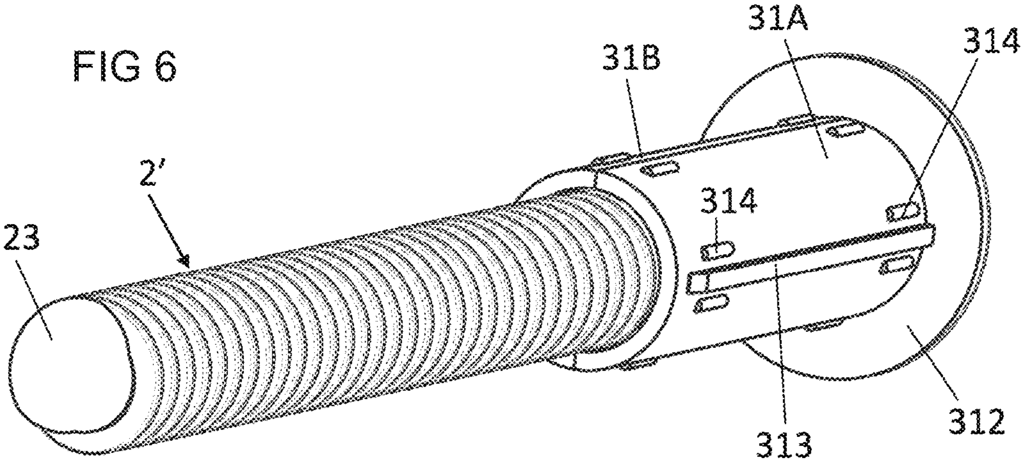
FIG. 6 shows a view of a screw and two inserts of the screw device of FIGS. 5A and 5B.
Figure 7:
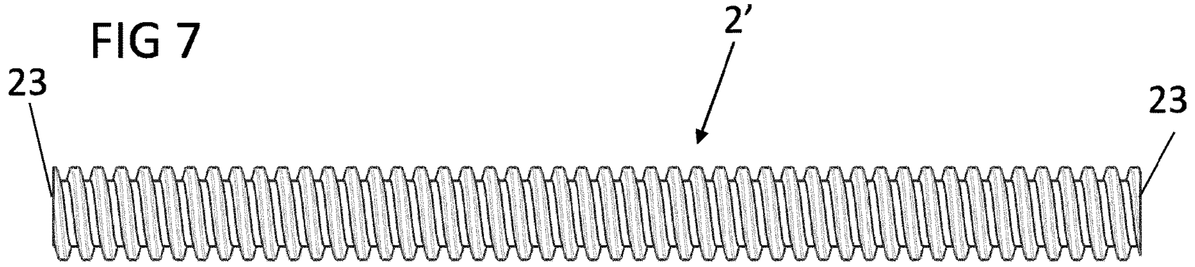
FIG. 7 shows a view of the screw of the screw device of FIGS. 5A and 5B.
Figure 8:
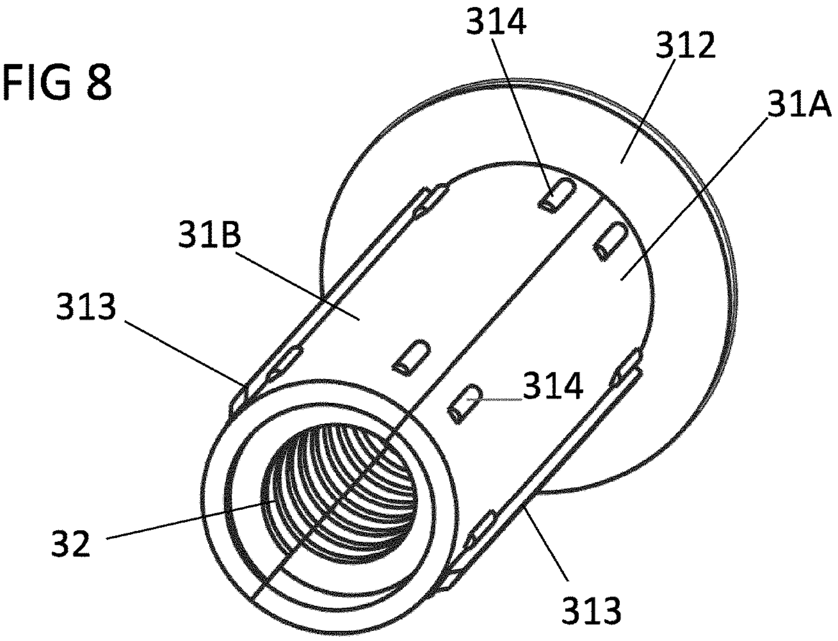
FIG. 8 shows a view of the two inserts of the screw device of FIGS. 5A and 5B.

FIGS. 6 and 8 show the inserts 31A, 31B in more detail, wherein particularly details of the ribs 313 can be seen. At their end facing away from the end cap 312 each of the ribs 313 have a lead-in chamfer to ease insertion in the grooves 304. Further, each of the inserts 31A, 31B optionally comprises several radially outwardly extending protrusions 314 to improve the alignment of the components or to compensate for mechanical tolerances.

It is worth noting that instead of two inserts 31A, 31B, one single insert may be used which may have the form as the two inserts 31A, 31B combined to one piece.

Figure 9:
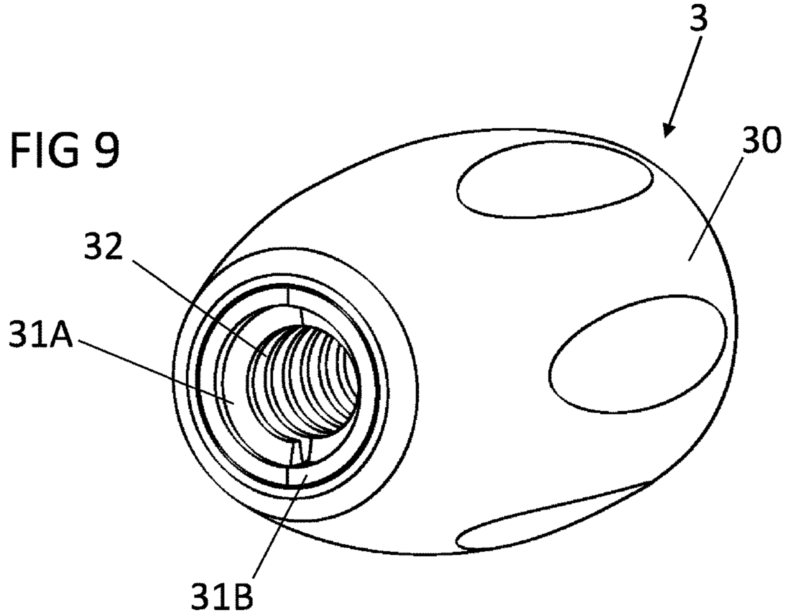
FIG. 9 shows a view of a handle of the screw device of FIGS. 5A and 5B.

As can be seen in FIG. 9, the outer shape of the handle 3 is convex (and has the depressions mentioned above) to allow a firm grip of a user of the screw assembly 1.

Figure 10A:
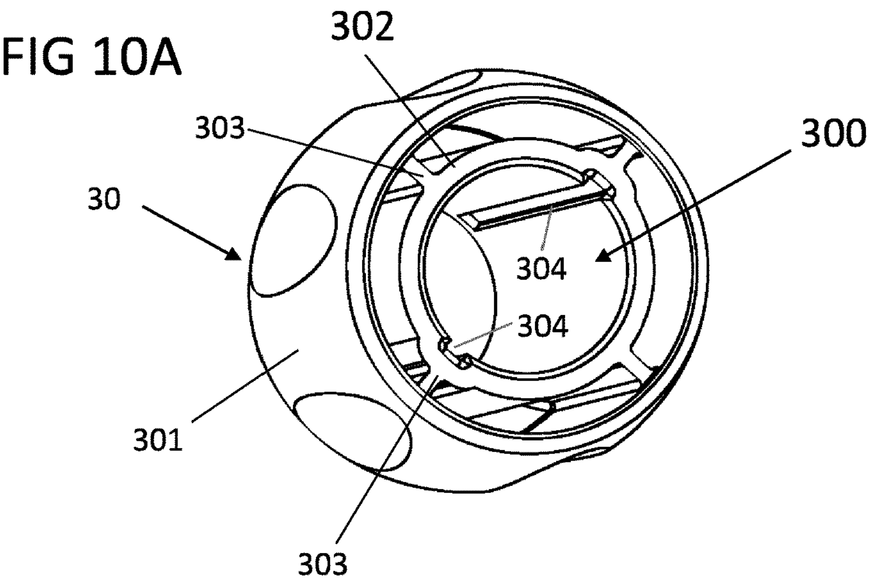
FIGS. 10A and 10B show views of a knob of the handle of the screw device of FIGS. 5A and 5B.
Figure 10B:
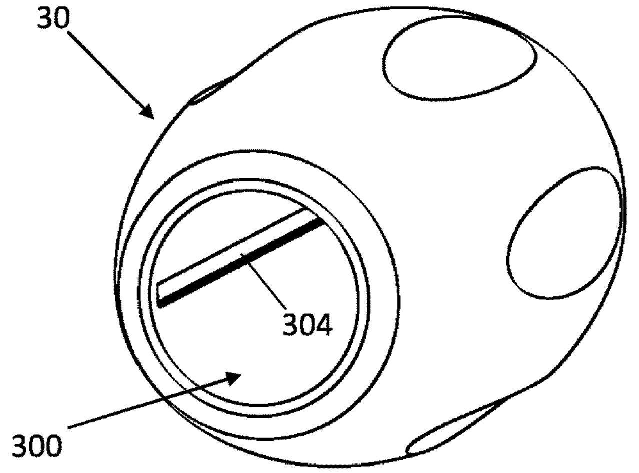

FIGS. 10A and 10B show the knob 30 of the handle 3. In the perspective views particularly, the grooves 304 are visible. The grooves 304 have an open end at the rear of the knob 30 (see FIG. 10A), and a closed end at the front of the knob 30. Thus, the knob can be translated onto the inserts 31A, 31B (and vice versa the inserts 31A, 31B into the knob 30) at the rear of the knob 30. In the mounted state the rear end of the knob 30 is covered by the end cap 312 of the first insert 31A.

Figure 11:
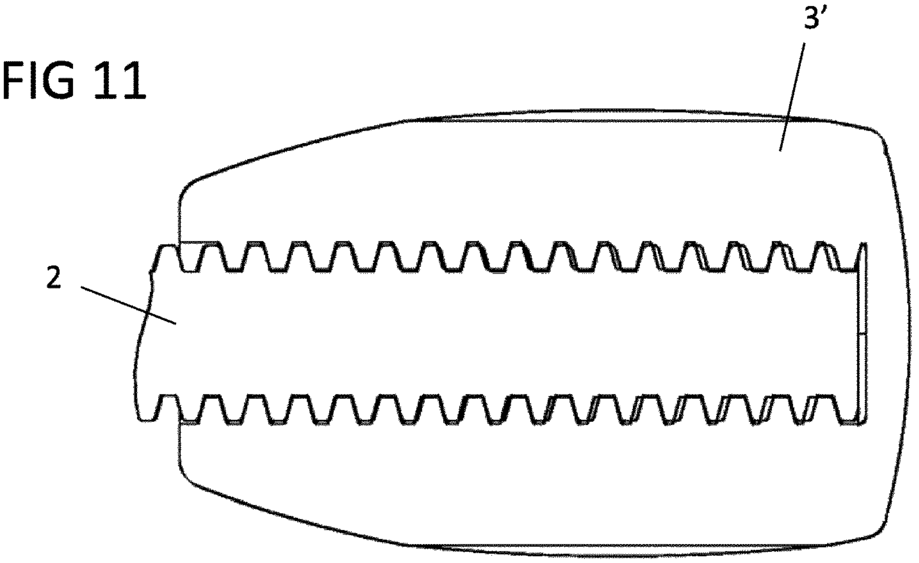
FIG. 11 shows a cross-sectional view of a screw assembly for the clamping device of FIG. 1.

FIG. 11 shows another embodiment of a one-pieced handle 3'. The handle 3' may be produced by injection molding and it may be mounted on the screw 2 by screwing it thereon. The handle 3' is formed with a thread, constituting a nut, with a thread (ridge) thickness varying (increasing) from the front to the rear of the handle 3', again leading to a force-locking connection with the screw 2.

The idea underlying the invention is not limited to the embodiments described above but may be implemented in a different fashion.

LIST OF REFERENCE NUMERALS

1 Screw assembly
2; 2' Screw
20 Thread
21 Disc
22 Pin
23 End
3; 3' Handle
30 Knob
300 Receptacle
301 Outer body
302 Inner body
303 Web
304 Groove
31A, 31B Insert
310 Shell
311 Thread section
312 End cap
313 Rib

314 Protrusion
32 Thread
4 Clamping device
40 Main body
400 Receptacle
401 Screw hole
41 Driver
5 Rack
6 Pole
A Thread axis
E Engagement region
T1, T2 Thread portion
X Interference

The invention claimed is:

1. A screw assembly for a clamping device, comprising:
a screw with a thread having a thread axis; and
a handle having a thread section constituting a nut,
the screw and the handle are fixed together as a screw-nut assembly,
at least one of the thread section of the handle and the thread of the screw is formed at least partially with a geometry varying along the thread axis such that the screw and the handle are engaged by helicoidal wedging, and
at least one parameter of the geometry of the thread of the screw and a corresponding parameter of a geometry of the thread section of the handle of the screw assembly at least partially do not match.

2. The screw assembly according to claim 1, wherein the at least one parameter of the geometry of the thread of the screw and/or of the geometry of the thread section of the handle is one of a thread diameter, a core diameter, a pitch, a thread height, and a flank angle.

3. The screw assembly according to claim 1, wherein a geometry of a starting portion of the thread of the screw, and a geometry of a starting portion of the thread section of the handle, match.

4. The screw assembly according to claim 1, wherein the geometry of the thread of the screw and/or the geometry of the thread section of the handle varies continuously along the thread axis.

5. The screw assembly according to claim 1, wherein the geometry of the thread of the screw and/or the geometry of the thread section of the handle varies discontinuously along the thread axis.

6. The screw assembly according to claim 1, wherein the handle comprises two inserts having the thread section constituting the nut and that are arranged in a receptacle of a knob of the handle.

7. The screw assembly according to claim 6, wherein the inserts are in a form-locking engagement with the knob that prevents a rotation of the knob with respect to the inserts about the thread axis.

8. The screw assembly according to claim 6, wherein the knob comprises an inner body that forms the receptacle, and an outer body, the inner body being arranged within the outer body, wherein a space is formed between the inner body and the outer body.

9. The screw assembly according to claim 1, wherein the handle and the thread section are formed in one piece.

10. The screw assembly according to claim 1, wherein the screw and/or the handle have trapezoidal threads.

11. A clamping device comprising:
a main body with a screw hole, and
a screw assembly comprising:
a screw with a thread having a thread axis; and
a handle having a thread section constituting a nut,
the screw and the handle are fixed together as a screw-nut assembly, and
at least one of the thread section of the handle and the thread of the screw is formed at least partially with a geometry varying along the thread axis such that the screw and the handle are engaged by helicoidal wedging,
wherein the screw of the screw assembly is or can be screwed into the screw hole of the main body, and
wherein the main body forms a claw with a receptacle adapted to receive a pole, screwing the screw of the screw assembly deeper into the screw hole of the main body fixes the clamping device on the pole.

12. A medical device comprising:
a medical device body; and
a clamping device attached to the medical device body, the clamping device comprising:
a main body with a screw hole, and
a screw assembly comprising:
a screw with a thread having a thread axis; and
a handle having a thread section constituting a nut,
the screw and the handle are fixed together as a screw-nut assembly, and
at least one of the thread section of the handle and the thread of the screw is formed at least partially with a geometry varying along the thread axis such that the screw and the handle are engaged by helicoidal wedging,
wherein the screw of the screw assembly is or can be screwed into the screw hole of the main body, and
wherein the main body forms a claw with a receptacle adapted to receive a pole, screwing the screw of the screw assembly deeper into the screw hole of the main body fixes the clamping device on the pole.

13. The medical device according to claim 12, wherein the medical device is one of a rack and a pump.

* * * * *